United States Patent
Ichiyanagi et al.

[11] Patent Number: 6,033,800
[45] Date of Patent: Mar. 7, 2000

[54] BATTERY CONTAINER, BATTERY AND LAYER-BUILT BATTERY

[75] Inventors: Takashi Ichiyanagi, Hirakata; Manabu Kakino, Uji; Kenji Sato, Toyohashi; Shinji Hamada, Toyohashi; Munehisa Ikoma, Toyohashi, all of Japan

[73] Assignee: Matsushita Electric Industrial Co., Ltd., Osaka, Japan

[21] Appl. No.: 08/913,596

[22] PCT Filed: Jan. 17, 1997

[86] PCT No.: PCT/JP97/00085

§ 371 Date: Nov. 25, 1997

§ 102(e) Date: Nov. 25, 1997

[87] PCT Pub. No.: WO97/26682

PCT Pub. Date: Jul. 24, 1997

[30] Foreign Application Priority Data

Jan. 17, 1996 [JP] Japan ................................. 8-005367

[51] Int. Cl.[7] ................................................. H01M 2/02
[52] U.S. Cl. ...................... 429/176; 429/148; 429/120; 429/151; 429/156
[58] Field of Search .......................... 429/72, 153, 148, 429/151, 156, 157, 163, 176, 152, 120

[56] References Cited

U.S. PATENT DOCUMENTS

| | | | |
|---|---|---|---|
| 1,558,384 | 10/1925 | Mattson | 429/163 |
| 1,696,001 | 12/1928 | Gunkel | 429/163 |
| 2,045,950 | 6/1936 | Hottel | 429/163 |
| 2,203,797 | 6/1940 | Pearson | 429/163 |
| 3,745,048 | 7/1973 | Dinkler et al. | 136/166 |
| 5,209,991 | 5/1993 | Stocchiero | 429/66 |
| 5,492,779 | 2/1996 | Ronning | 429/120 |
| 5,510,203 | 4/1996 | Hamada et al. | 429/53 |
| 5,686,202 | 11/1997 | Hooke et al. | 429/160 |

FOREIGN PATENT DOCUMENTS

| | | |
|---|---|---|
| 58-80262 | 5/1983 | Japan . |
| 6-349461 | 12/1994 | Japan . |
| 7-235256 | 9/1995 | Japan . |

*Primary Examiner*—Maria Nuzzolillo
*Assistant Examiner*—Jennifer O'Malley
*Attorney, Agent, or Firm*—Ratner & Prestia

[57] ABSTRACT

A battery container for containing battery elements includes large thickness sections formed on the outer rims of walls that compose the container and small thickness areas formed in the areas surrounded by the large thickness sections. A spacer that is formed of straight-line ribs, a combination of latticed ribs and projections, cylindrical projections or the like is disposed on the small thickness areas and the outer surface of the spacing means protruded out of the outer surfaces of the large thickness sections, thereby ensuring the mechanical strength and durability of the container and at the same time allowing cooling air to circulate efficiently along the walls of the battery envelope. This facilitates the transfer of heat produced inside of the battery to the outside.

20 Claims, 11 Drawing Sheets

BATTERY CONTAINER, BATTERY AND LAYER-BUILT BATTERY

This application is the U.S. national-phase application of PCT International Application No. PCT/JP97/00085.

1. Field of the Invention

The present invention relates to a battery container, and a battery and multi-tier battery using the battery container.

2. Background of the Invention

It is a usual practice to build a large capacity battery by putting together a plurality of unit battery cells of nickel-cadmium battery, nickel-hydrogen battery, hydrogen battery and the like.

The large capacity battery thus constructed is used as a power supply source in various home electrical appliances and electric automobiles.

Heat is produced inside of the battery of this type due to charging and discharging of the unit battery cells while the battery is used.

Since battery's electric energy storing elements such as electrodes, electrolyte and the like are, in general, contained and sealed in a container made of synthesized resin materials such as polypropylene and the like, the heat Produced inside is accumulated within the battery, thereby causing the internal temperature of each respective unit battery cell to increase. The increased temperature of the unit battery cells results in degradation of the electric energy storing elements, deterioration in battery performance and shorter life of the battery.

Large capacity batteries are sometimes built by putting together as many unit battery cells as several tens to several hundreds and in that case each respective unit battery cell located in the center of a group of unit battery cells is exposed to the heat produced in both the neighboring unit battery cells.

On top of that, heat dissipation from the unit battery cells located in the center is hindered from taking place.

The net result is a tremendous temperature increase in the unit battery cells.

As unit battery cells having the larger storage capacity per unit volume are used or the more improved battery performance is sought, the more amount of heat is produced.

The problem of the above accumulation of heat or temperature rise observed in a battery wherein a plurality of unit battery cells are put together was addressed by the technology disclosed in the Japanese Patent Gazette TOKKAIHEI3(1991)-291867.

According to this technology, heat is dissipated by providing spacings between unit battery cells, where air is allowed to circulate.

However, even by providing air circulating spacings between unit battery cells, the temperature rise of batteries has not been adequately suppressed.

The reason for above is that even if air is brought into contact with the walls that form a container for unit battery cells the container made of synthetic resin shows low thermal conductivity, thus resulting in an inadequate dissipation of heat through the walls of the container.

SUMMARY OF THE INVENTION

The present invention provides a battery container and a battery using it, whereby deterioration of battery characteristics due to heat accumulation or temperature rise within the battery can be prevented by improving thermal dissipation of the battery.

For achieving the above objective, the present invention discloses a container for containing battery elements that comprises walls, each of which has large thickness sections on the outer rims of the wall's four sides and a small thickness area surrounded by the foregoing large thickness sections with the thickness thereof made smaller than that of the large thickness sections.

Also, the present invention discloses a container for containing battery elements that comprises walls, each of which has large thickness sections on the outer rims of the wall's three sides with the lower side of the wall excluded and a small thickness area surrounded by the foregoing large thickness sections with the thickness thereof made smaller than that of the large thickness sections.

In addition, the small thickness area surrounded by the large thickness sections located on the outer rims of each respective wall that composes a container for containing battery elements occupies 40 to 80% and more preferably 50 to 70% of the wall's area.

Further, the thickness of the small thickness area is 20 to 70% and more preferably 40 to 60% of that of the large thickness sections surrounding the small thickness area.

Also, a wall surface that composes a container for containing battery elements and has a small thickness area surrounded by large thickness sections formed on the outer rims of the wall surface is provided on each of at least one pair of the container's side walls that are situated opposite to each other, and the thickness of the small thickness area is allowed to be uniform or nonuniform over the entire area. When the thickness of the small thickness area is nonuniform, the maximum thickness and minimum thickness are preferred to fall within the ranges as described in the above.

In addition, the foregoing small thickness area is allowed to be located at any place of the walls of the container. Therefore, the small thickness area can be situated only on one wall of the container, but by arranging the small thickness area on a plurality of walls, heat dissipation capabilities can be enhanced. For example, if the container is shaped like a book, an arrangement whereby the small thickness area is placed on each of the two side surfaces having the largest area results in enhanced heat dissipation capabilities.

Further, a wall surface that composes a container for containing battery elements and has large thickness sections on the outer rims of the wall surface is provided with a small thickness area surrounded by the foregoing large thickness sections with the thickness of the small thickness area made smaller than that of the large thickness sections, and the outer surface of the small thickness area is provided with a spacing means formed of straight-line ribs, a combination of latticed ribs and projections, cylindrical projections or the like with the outer surface of the spacing means extending beyond that of the large thickness sections.

In addition, the spacing means is not only formed on the region of the side wall where the small thickness area is located, but also extending to the large thickness sections of the side wall. Also, the spacing means may be provided on the external surface of the large thickness sections.

The spacing means is also formed of square pillar like projections that are laid out in a staggered arrangement, thereby making it possible to enhance heat dissipation effect.

The present invention provides a battery using a battery container that incorporates one of the foregoing structures as disclosed by the present invention and contains battery elements therein and also a multi-tier battery built by putting together a plurality of the foregoing batteries.

Therefore, according to the present invention, each respective wall composing a battery container is provided with large thickness sections on four outer rims thereof or on three outer rims excluding the bottom rim thereof and a small thickness area in the region thereof surrounded by the large thickness sections with the thickness of the small thickness area made smaller than that of the foregoing large thickness sections, and also a spacing means formed of straight-line ribs and the like is provided on the outer surface of the small thickness area with the outer surface of the spacing means protruding beyond the outer surface of the large thickness sections, thus allowing the container to have adequate rigidity and durability and also facilitating coolants such as air and the like to circulate efficiently along the inner surfaces of the battery container.

As a result, heat dissipation through the walls is improved when compared with prior art containers, thus facilitating the heat produced inside of the battery to dissipate to the outside and greatly contributing to an effective improvement of the battery's performance and life.

DETAILED DESCRIPTION OF THE INVENTION

Figure 1:
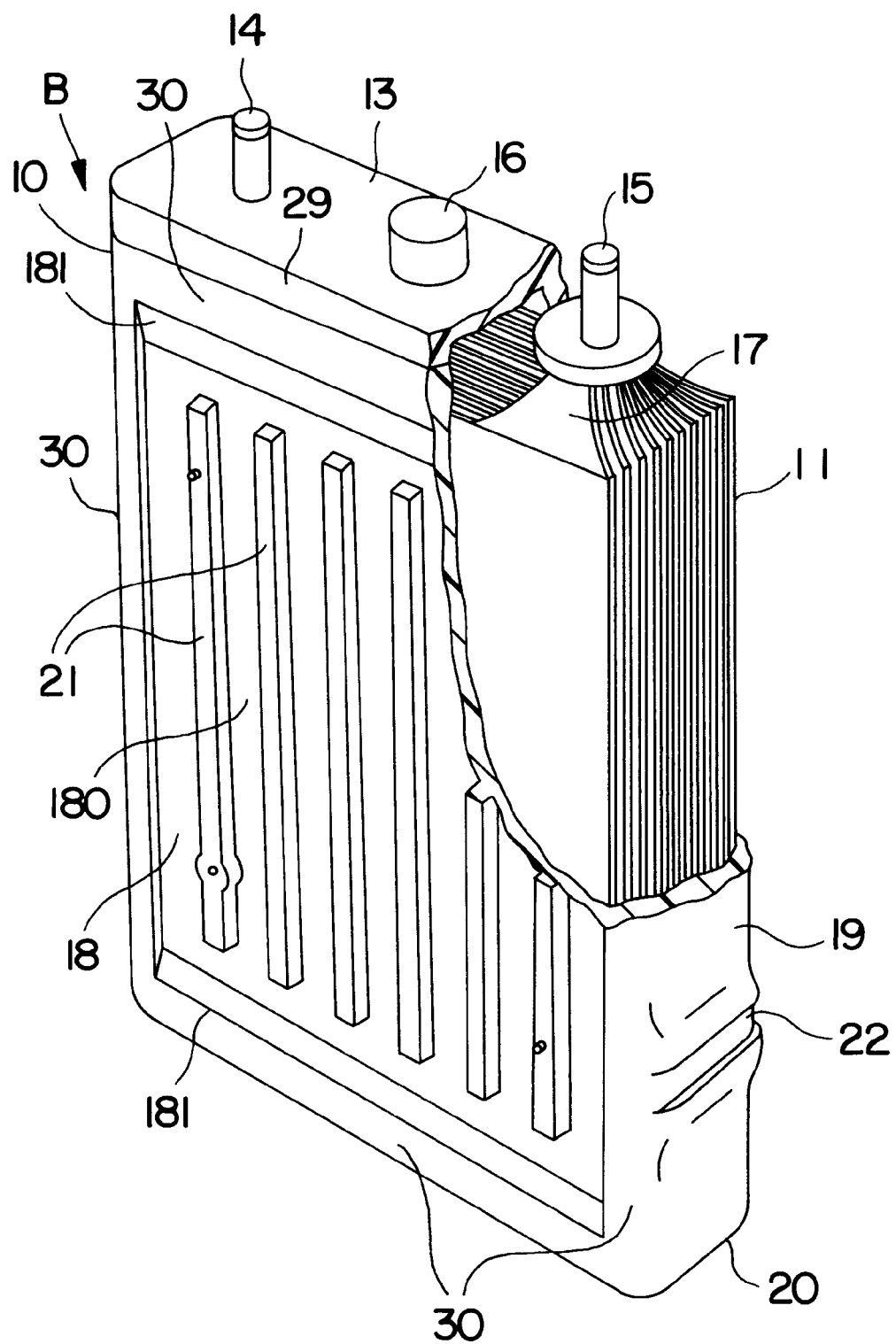
FIG. 1 is a partially cutaway perspective view to show a structure of a battery as Example 1 in a first exemplary embodiment of the present invention.

Next, an explanation will be made on an exemplary embodiment of the present invention with reference to drawings.
First Exemplary Embodiment FIG. 1 shows a structure of a unit battery cell that forms a multi-tier battery in a first exemplary embodiment of the present invention. A unit battery cell B comprises a container 10 made by molding a polymer alloy resin composed of polyphenylene ether resin and polystyrene resin and a lid 13 to cover an upper opening of the container 10, wherein a group of electrodes 11 prepared by stacking positive electrode plates, negative electrode plates and separators are contained. Electrolyte is filled in the container 10 although it is not shown in the drawing.

A positive terminal 14 and a negative terminal 15 made of iron with nickel plating applied and a safety vent 16 are provided on the upper surface of the lid 13.

A plurality of leads 17 are connected at each respective end of one end to the negative terminal 15 by welding inside of the lid 13 and at the other end to a corresponding negative electrode plate of the group of electrodes 11.

Although not shown in the drawing, leads connect between the positive terminal and the positive electrode plates of the group of electrodes 11 in a similar way.

Figure 2:
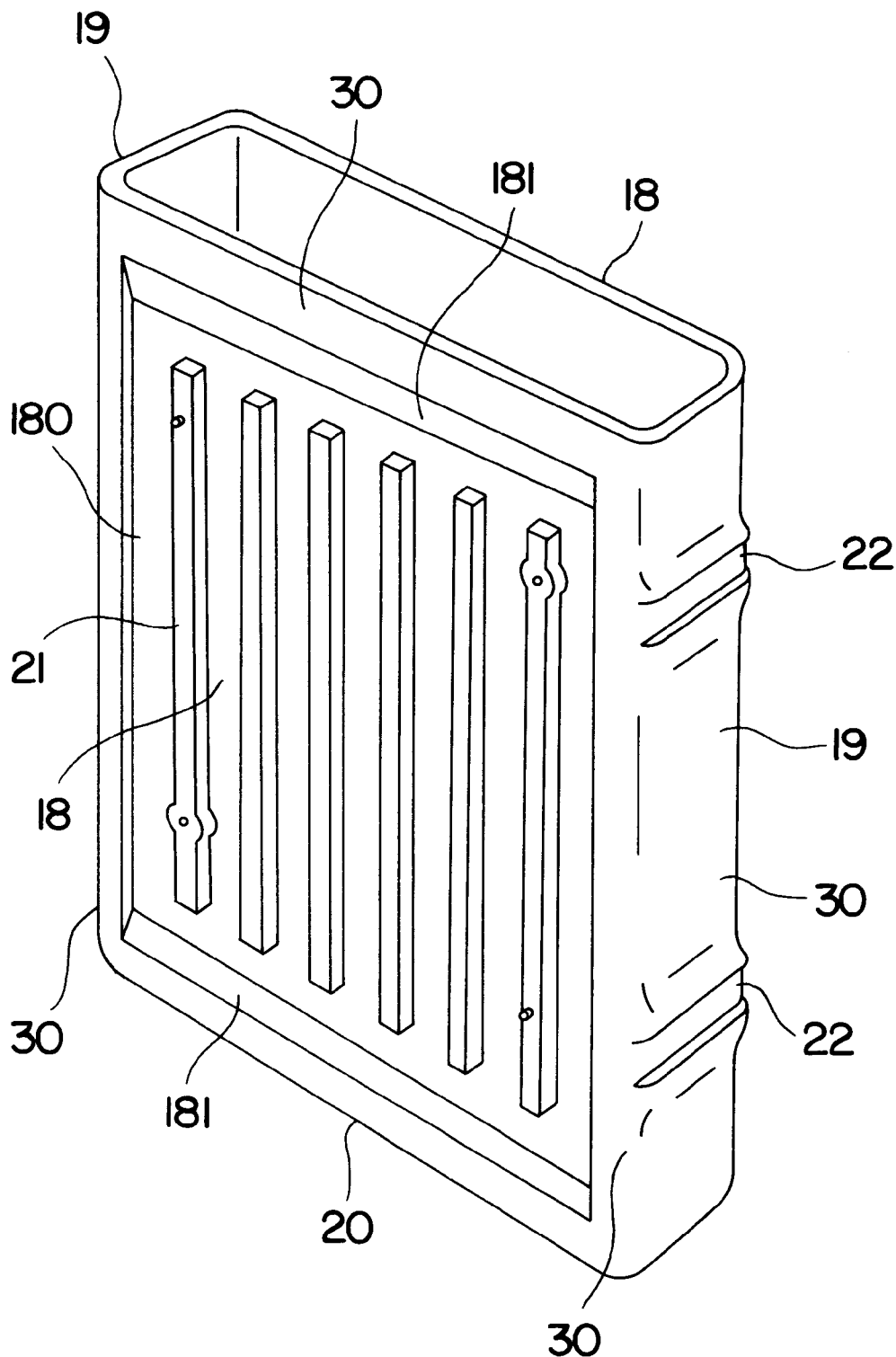
FIG. 2 is a perspective view of the container of the foregoing battery as Example 1.
Figure 3:
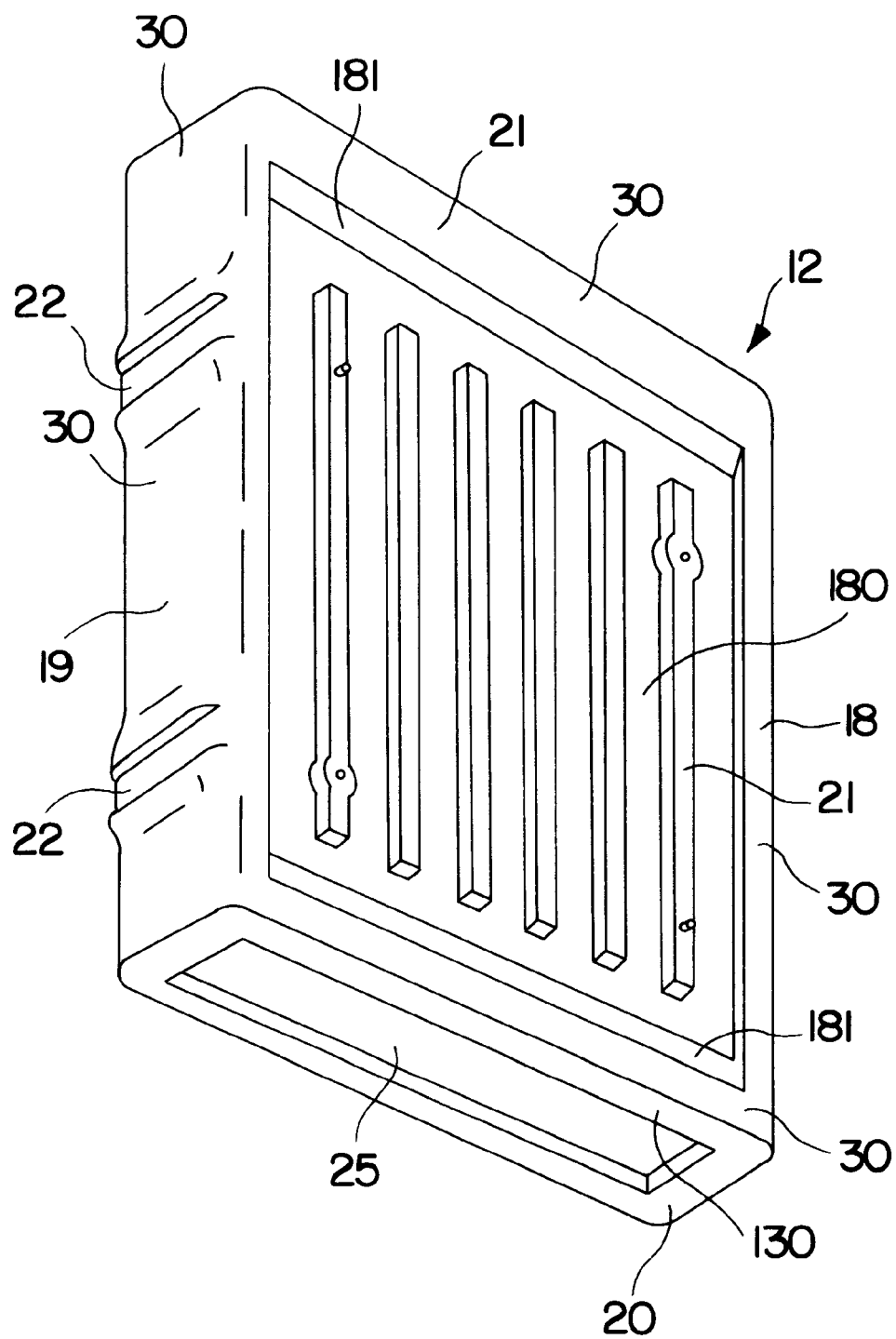
FIG. 3 is another perspective view of the container of the battery as Example 1.

FIG. 2 is a perspective view of the container 10 viewed from above and FIG. 3 is a perspective view of the container 10 viewed upward.

As observed in FIG. 2 and FIG. 3, the container 10 has two large area side walls 18, where side walls of neighboring unit battery cells come into contact when a multi-tier battery is built, two narrow side walls 19 that join to the side walls 18 and a bottom 20.

As shown in FIG. 1, a unit battery cell B is completed by the steps of having battery elements that are formed of electrolyte and a group of electrodes 11 contained in the container 10 and covering the opening at the top of the container 10 with the lid 13 by welded sealing.

Relatively large thickness sections 30 are formed on the rims of the four sided side walls 18 of the container 10 and the entire side walls 19 have the same thickness as the foregoing large thickness sections 30, thereby maintaining sufficient mechanical rigidity and durability for the envelope 10.

Similarly, relatively large thickness sections 130 are formed on the rims of the four sided bottom 20 with a resulting contribution to maintaining sufficient mechanical rigidity and durability for the container 10.

It is possible for the large thickness sections of the bottom 20 to have the same thickness as the side walls 18 have or a larger thickness than the large thickness sections 30 show.

Large thickness sections 29 of the same thickness as the large thickness sections 30 of the container 10 are formed on the lower surfaces of the rims of the lid 13 and come into contact with the edges of the opening of the envelope 10.

The side wall 18 has a relatively small thickness area 180 surrounded by large thickness sections 30 that are formed on the rims thereof, thereby facilitating dissipation of internal heat. It is also possible for the bottom 20 to have a relatively small thickness area 25 surrounded by large thickness sections 130 that are formed on the rims thereof, thereby facilitating effective dissipation of internal heat.

Although not shown in the drawings, it is also possible for each respective side wall 19 of the unit battery cell B to have a small thickness area surrounded by the large thickness sections 30 that are formed on the rims thereof, thereby further facilitating dissipation of internal heat.

In addition, inclined surfaces 181 are provided on the boundaries between the large thickness sections 30 and the small thickness area 180 that are situated at both the top and bottom parts of each respective side wall 18, thereby facilitating a vertical flow of coolants.

Recesses 22 formed on each respective side wall 19 near the upper and lower edges thereof are for mating with bridging members where a plurality of the unit battery cells B are put together to build a multi-tier battery.

On the small thickness area 180 of the outer surface of each respective side wall 18 are formed a plurality of straight-line ribs 21 running vertically in parallel with one another and serving as spacing means to enhance the dissipation of heat produced inside of unit battery cells B by facilitating a flow of air when a plurality of unit battery cells B are put together to build a multi-tier battery.

Here, the total area of the small thickness areas 180 of a unit battery cell B and a multi-tier battery is derived by calculation from an equation of (number of the small thickness area 180)×(width of the small thickness area 180)×(length of the small thickness area 180). The area of each respective side wall 18 is derived by calculation from an equation of (height of the side wall 18)×(length of the side wall 18).

Also, the area of each respective small thickness area 180 is derived by calculation from an equation of (the area of the side wall 18)−(a total area of the large thickness sections 30, spacing means which are straight-line ribs 21 in FIG. 1 to FIG. 3 and inclined surfaces 181).

A unit battery cell B thus structured can be used not only to form a multi-tier battery, but also as a unit battery for various applications. When the unit battery cell B is used as a unit battery, the heat produced inside of the unit battery cell 3 is dissipated outside through the walls of the container 10.

Since small thickness areas 180 are provided on the walls 18 that have the largest area among the walls of container 10, the distance, across which heat has to travel in the envelope 10 made of a material having a low heat conductivity, becomes short and, together with the effect of increased heat dissipation areas due to the existence of straight-line ribs, the ability of heat dissipation of the unit battery cell B can enhanced greatly.

Particularly, by arranging the position of the unit battery cell B to have the small thickness areas 180 thereof exposed well to outside air, the heat dissipation will be improved much more.

Next, some of the specific examples in the first exemplary embodiment of the present invention will be described in detail.

EXAMPLE 1

A compound of active substances mainly comprising nickel hydride powder is filled in foamed porous nickel and the resulting material is rolled and cut to specified dimensions to produce positive nickel electrodes with a drainage capacity of 10 Ah per electrode plate.

Also, a coating formed of hydrogen-storing alloy powder having a composition of MmNi3.6Co0.7Mn0.4Al0.4 (Mm: Mesh Metal) and mixed with a binder is applied to punching metal, and the resulting material is rolled and cut to specified dimensions to produce negative hydrogen-storing alloy electrodes with a drainage capacity of 13 An per electrode plate. After these positive and negative electrodes are wrapped in bag-like separators individually, 10 of the positive electrode and 11 of the negative electrode are alternately stacked one over another forming a group of electrodes 11, one end of each respective positive and negative lead 17 is connected with each of the corresponding positive and negative electrodes, the other end thereof is connected with a positive terminal 14 and negative terminal 15, respectively, and the whole assembly is placed in an container 10 and then finally 180 ml of alkaline electrolyte is poured in the container 10 to produce a unit battery cell B.

The unit battery cell B thus produced in the present Example 1 measures as follows: The container 10 measures 173 mm high, 116 mm long and 36 mm wide, large thickness sections 30 of a side wall 18 of the container 10 measure 3.4 mm thick and 7.5 mm wide, a small thickness area 180 of the side wall 18 measures 2 mm thick. Large thickness sections of a side wall 19 measure 3.4 mm thick and 36 mm wide and large thickness sections 130 of a bottom 20 of the container 10 measure 3.4 mm thick and 36 mm wide.

Each of six straight-line ribs 21 measures 4 mm wide, 1.9 mm high (with the difference in height between the surface of the large thickness section 30 of the side wall 18 and the upper surface of the straight-line ribs 21 made 0.5 mm) and 140 mm long with a spacing between the two neighboring straight-line ribs 21 established at 11 mm.

In other words, the area occupied by the small thickness areas 180 on the side walls 18 is 10780 mm$^2$ excluding the area occupied by the straight-line ribs 21, and the total area of the side walls 18 is 17516 mm$^2$.

EXAMPLE 2

A unit battery cell B in Example 2 is the same as the unit battery cell B described in Example 1 except that the number of straight-line ribs 21 is increased from six to ten and the width and spacing between ribs are changed to 2.4 mm and 3.45 mm, respectively.

Further, the area occupied by the small thickness areas 180 on the side walls 18 in the present Example 2 is 10780 mm$^2$ excluding the area occupied by the straight-line ribs 21.

EXAMPLE 3

A unit battery cell B in Example 3 is the same as the unit battery cell B described in Example 1 except that the number of straight-line ribs 21 is increased from six to 14 and the width and spacing between ribs are changed to 1.7 mm and 3.45 mm, respectively.

Further, the area occupied by the small thickness areas 180 on the side walls 18 in the present Example 3 is 10808 mm$^2$ excluding the area occupied by the straight-line ribs 21.

The unit battery cells B as described in the above Example 1 to Example 3 are charged at 10 A for 15 hours and then subjected to an initial discharge at 20 A until the battery voltage is decreased to 1.0 V.

The foregoing charging and discharging of the unit battery cells B have caused the groups of electrodes to bulge, resulting in a condition wherein groups of electrodes are brought into a close contact with the inner surfaces of the side walls 18 of the container 10.

Each respective unit battery cell B of Example 1 to Example 3 as a battery capacity of 100 Ah, which is restricted by the drainage capacity of the positive electrode of the unit battery cell B.

Second Exemplary Embodiment

Next, a second exemplary embodiment of the present invention will be explained with reference to FIG. 4 to FIG. 6.

Figure 4:
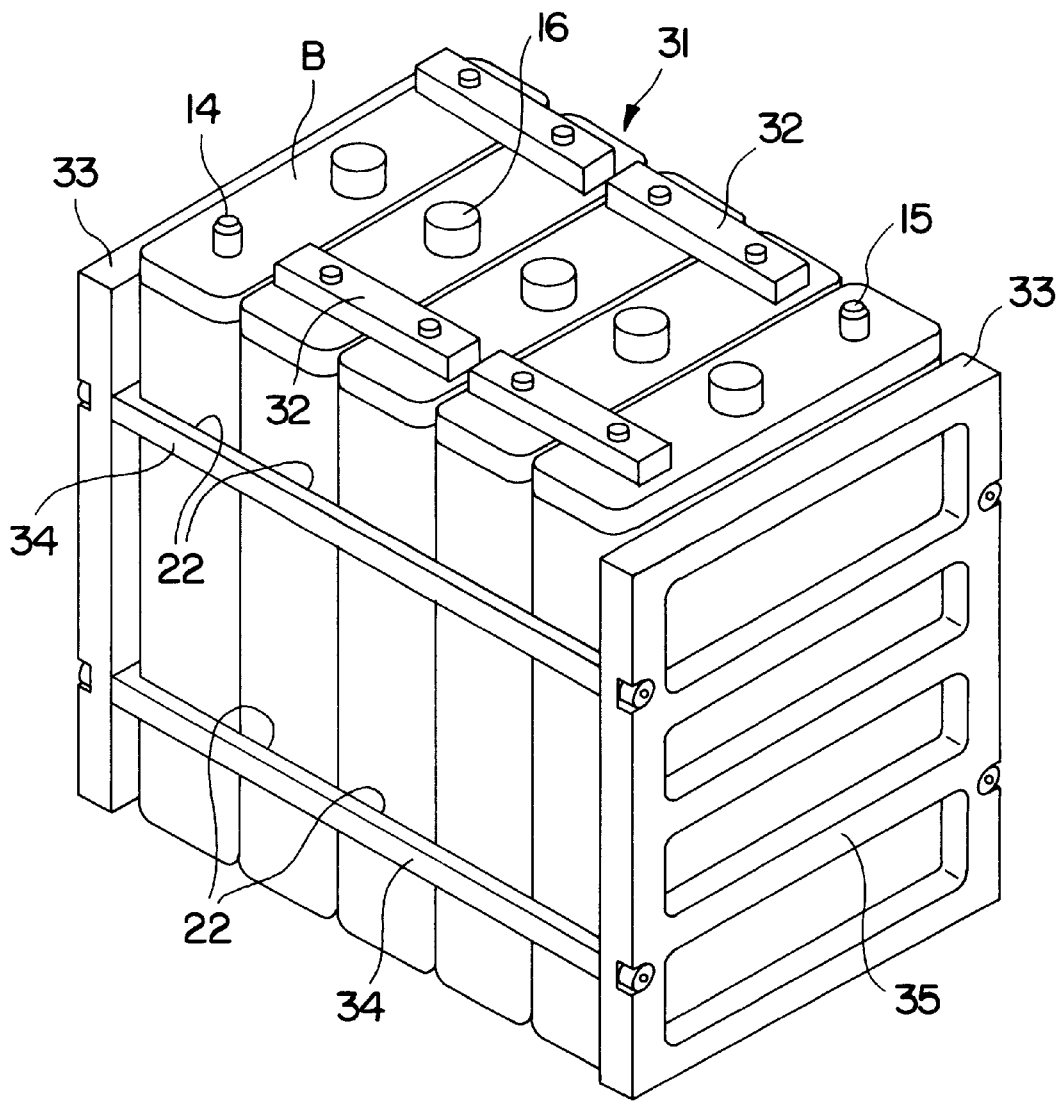
FIG. 4 is a perspective view of a multi-tier battery in a second exemplary embodiment of the present invention.

As shown in FIG. 4, a multi-tier battery 31 is built by putting together a plurality of unit battery cells B that have been described in the first exemplary embodiment of the present invention.

The unit battery cells B are arranged to have two side walls 18 that belong to two neighboring unit battery cells, respectively, faced with each other. As shown in detail in FIG. 5 and FIG. 6, one side wall 18 is aligned with an opposing side wall 18 so that both the straight-line ribs 21 provided on the outer surface of each respective side wall 18 may hit each other.

The multi-tier battery 31, as shown in FIG. 4, has five unit battery cells B put together, has an aluminum made end plate 33 arranged on each respective end thereof and has the two end plates 33 linked with each other by means of four square pillar like bridging members.34, thereby realizing a single-piece construction.

Each respective bridging member 34 mates with recesses 22 provided on he side surfaces of each unit battery cell B, whereby an assignment and fixing in position of each respective unit battery cell B are assured.

Since each respective unit battery cell B tends to be deformed, while in operation, in such a way as the unit battery cell is detached from each other due to a dilatation of groups of electrodes 11 contained in the unit battery cell B and a rise in internal pressure of the unit battery cell B, it is needed to fasten and solidify the whole multi-tier battery assembly to form a single-piece construction by means of the foregoing end plates 33 and bridging members 34.

Reinforcing ribs 35 are provided on the end plates 33.

On the upper side of the unit battery cells B, a positive terminal and negative terminal of each respective unit battery cell B are electrically connected in succession with counterparts of neighboring unit battery cells B by connecting conductors 32.

In other words, the multi-tier battery 31 is structured in such a way that a plurality of unit battery cells B are connected in series.

Figure 5:
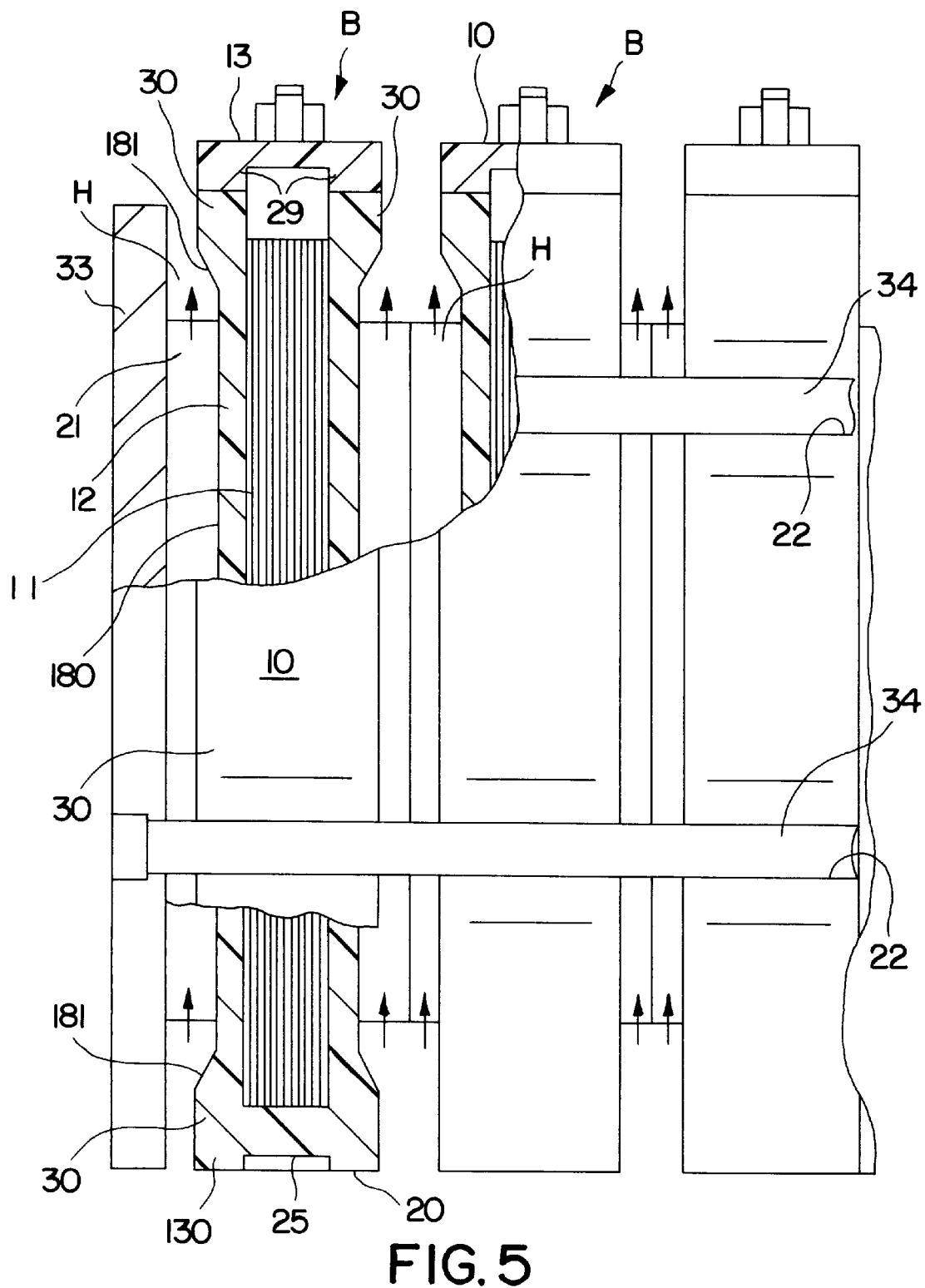
FIG. 5 is an enlarged partially sectional side view of the foregoing multi-tier battery.
Figure 6:
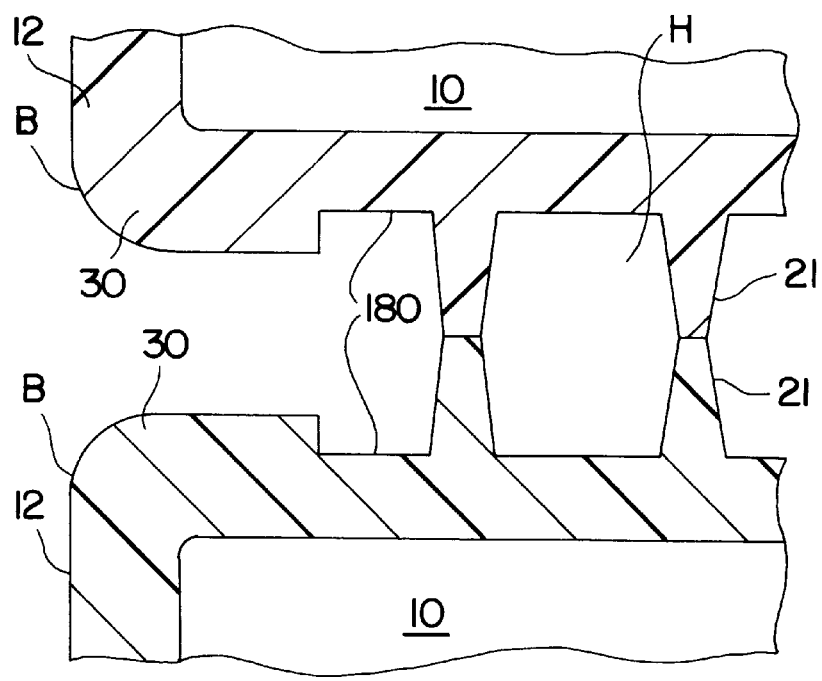
FIG. 6 is an enlarged partially sectional plan view of the foregoing multi-tier battery.

As shown in FIG. 5 and FIG. 6, heat dissipation channels H are provided by spaces that are formed by respective large thickness sections 30 and small thickness areas 180 of two neighboring unit battery cells B and divided by straight-line ribs 21 of the same two neighboring unit battery cells B as above, running vertically and hitting one another on the top thereof.

Such coolants as air and the like are circulated through the heat dissipation channels H, thereby radiating heat from the small thickness areas 180 effectively.

A vertical circulation of air takes place in the heat dissipation channels H only through natural convection of air heated at the bottom of the heat dissipation channels H.

As a matter of course, air can be also forced into the heat dissipation channels H.

When small thickness areas are provided on the side walls 19 or on the bottom 20 of the multi-tier battery 31, heat can be dissipated through these small thickness areas.

Next, some of the specific examples in the second exemplary embodiment of the present invention will be described in detail.

EXAMPLE 1

A multi-tier battery as shown in FIG. 4 and FIG. 5 has been built by using five unit battery cells B with each respective side wall thereof provided with six straight-line ribs 21 as described in Example 1 of the first exemplary embodiment of the present invention. End plates 33 made of aluminum are used.

EXAMPLE 2

A multi-tier battery has been built in the same way as in the foregoing Example 1 except for using unit battery cells B with each respective side wall thereof provided with ten straight-line ribs 21 as described in Example 2 of the first exemplary embodiment of the present invention.

EXAMPLE 3

A multi-tier battery has been built in the same way as in the foregoing Example 1 except for using unit battery cells B with each respective side wall thereof provided with 14 straight-line ribs 21 as described in Example 3 of the first exemplary embodiment of the present invention.

Next, results of various performance tests conducted on the multi-tier batteries built in the foregoing exemplary embodiments of the present invention will be explained.

A discharge capacity test conducted comprises the sequential steps of charging a multi-tier battery at a current of 10 A for 12 hours, leaving the battery idle for one hour and discharging the battery at a current of 20 A until the battery voltage decreases to 5 V.

A discharge capacity of a multi-tier battery is derived by calculation from the discharge time required of the battery voltage to decrease to 10 V.

A discharge capacity of a unit battery cell B is derived by calculation from the discharge time required of the voltage of the unit battery cell B to decrease to 1 V.

When a multi-tier battery is charged, air is blown to heat dissipation channels H between unit battery cells B, side surfaces and end plate surfaces of the multi-tier battery from the bottom thereof by the use of a fan.

The output of the fan has been adjusted so that the speed of the air passing through the heat dissipation channels H averages 1.0 m/s. The ambient temperature is taken as 20° C.

Cycle life tests have been performed by repeating the same test condition as used in charging and discharging of the discharge capacity test.

An initial length of the multi-tier battery (excluding the end plates 33) is taken as 390 mm.

Life cycle test results and maximum changes in length of multi-tier batteries at the end of the tests are shown in Table 1.

TABLE 1

|  | Second Exemplary Embodiment | | |
|---|---|---|---|
|  | Example 1 | Example 2 | Example 3 |
| Multi-Tier Battery No. | 1 | 2 | 3 |
| Discharge Capacity (Ah) | 83 | 97 | 98 |
| Life (cycle) | 300 | 880 | 900 |
| Maximum Change in Length (mm) | 4.8 | 2.0 | 1.9 |
| Energy Density (Wh/kg) | 58 | 65 | 65 |

As clearly shown in Table 1, the multi-tier battery No. 1 is large in change of length due to poor dissipation of heat, and has short cycle life and low values in discharge capacity and energy density.

On the other hand, the multi-tier battery Nos. 2 and 3 show fairly well suppressed deformations, and have excellent values in discharge capacity, cycle life and energy density.

It is clear from the foregoing test results that the preferred number of the straight-line ribs ranges from 10 to 14 when the spacing means are formed of straight-line ribs 21.

Third Exemplary Embodiment

Figure 7:
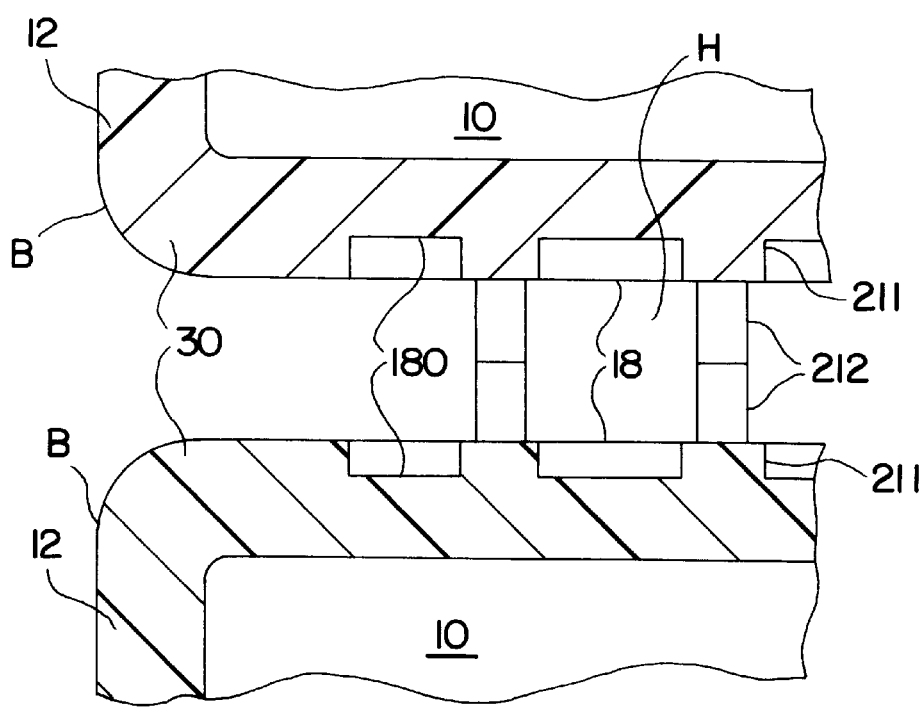
FIG. 7 is a partially sectional plan view of a multi-tier battery container in a second exemplary embodiment of the present invention.

Next, a third exemplary embodiment of the present invention is explained with reference to FIG. 7 and FIG. 8.

The fundamental structure of unit battery cells B in the present exemplary embodiment is the same as in the first and second exemplary embodiments except for the structure of spacing means.

Figure 8:
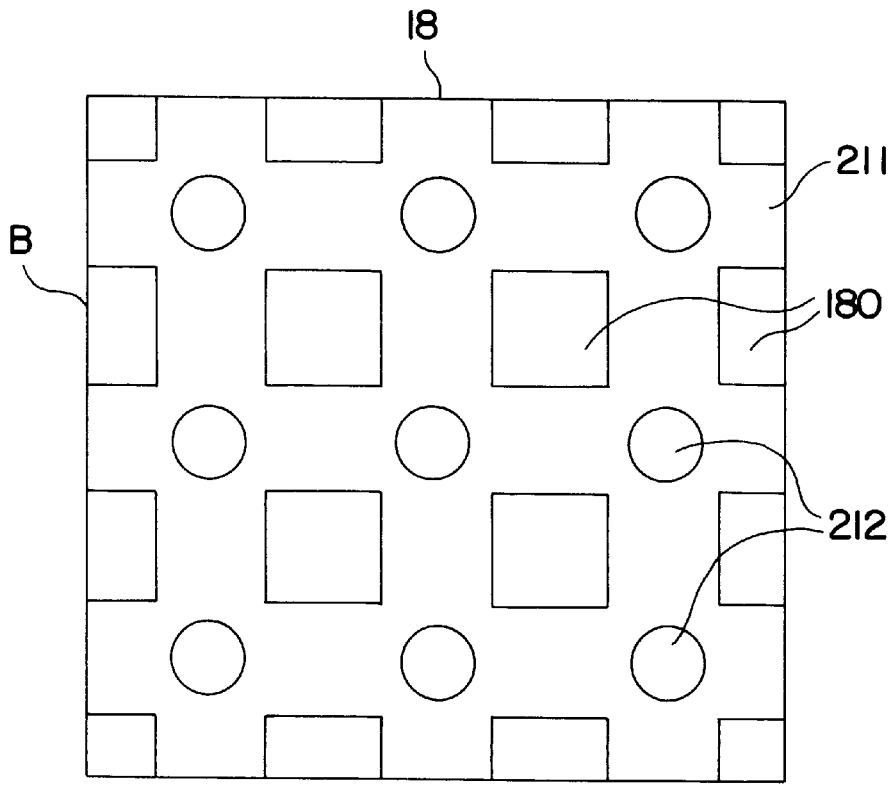
FIG. 8 is a partial front view of a side wall of the foregoing multi-tier battery container.

As illustrated in FIG. 8, the spacing means in the present exemplary embodiment is formed of latticed ribs 211 arranged on the outer surface of a small thickness area 180 and projections 212 provided on the latticed ribs 211.

Since the latticed ribs 211 and projections 212 are disposed on the same places of a plurality of unit battery cells B, respectively, heat dissipation channels H are formed between two neighboring unit battery cells B with the projections 212 thereof bumping against one another when unit battery cells B are put together to build a multi-tier battery.

Spacers thus formed of latticed ribs 211 and projections 212 provide spacious heat dissipation channels H and air flows smoothly, resulting in excellent heat dissipation.

Fourth Exemplary Embodiment

Next, a fourth exemplary embodiment of the present invention is explained with reference to FIG. 9.

The fundamental structure of unit battery cells B in the present exemplary embodiment is the same as in the first and second exemplary embodiments and what is different from the exemplary embodiment so far explained with the present exemplary embodiment is in the structure of spacing means as experienced before.

Figure 9:
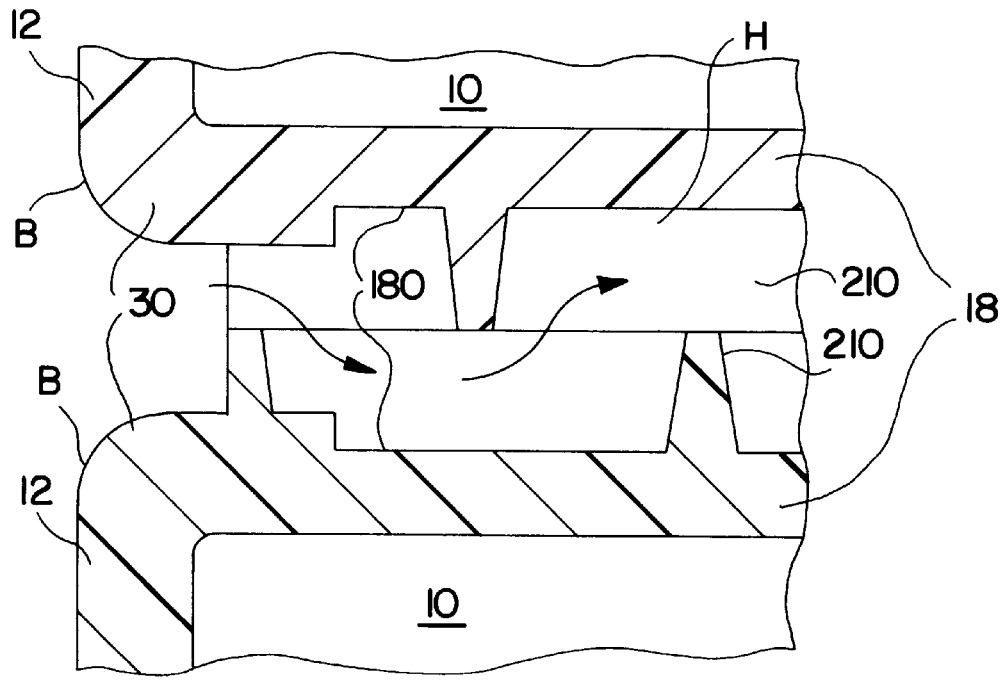
FIG. 9 is a partially sectional plan view of a multi-tier battery container in a fourth exemplary embodiment of the present invention.

As illustrated in FIG. 9, the spacing means in the present exemplary embodiment are latticed ribs 210 of another configuration formed on the surface of a small thickness area 180 extending from an upper large thickness section 30 of a side wall 18 to an opposing lower large thickness section 30 like long small bridges.

When a plurality of unit battery cells B are put together to build a multi-tier battery, the latticed ribs 210 thus disposed on a unit battery cell B are staggered from the latticed ribs 210 disposed on the other neighboring unit battery cell B in position.

Therefore, heat dissipation channels H are provided by the space formed between large thickness sections 30 of two neighboring unlit battery cells B and also between small thickness area 180 of the two neighboring unit battery cells B with (each respective space separated by the latticed ribs 210 that are formed on each respective unit battery cell B and staggered in position from one another, thus resulting in providing zigzag heat dissipation channels H.

Fifth Exemplary Embodiment

Next, a fifth exemplary embodiment of the present invention is explained with reference to FIG. 10.

The fundamental structure of unit battery cells B in the present exemplary embodiment is the same as in the first and second exemplary embodiments and what is different from the exemplary embodiments so far explained with the present exemplary embodiment is in the structure of spacing means as experienced before.

Figure 10:
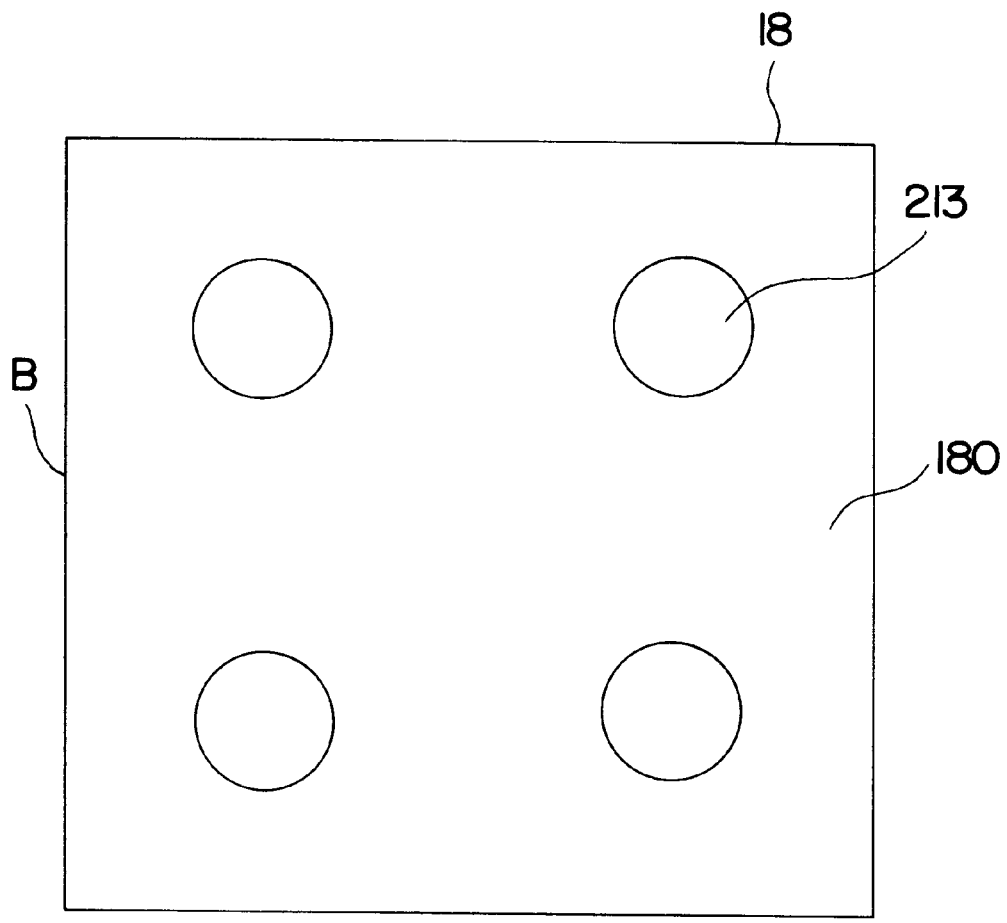
FIG. 10 is a partial front view of a side wall of a multi-tier battery container in a fifth exemplary embodiment of the present invention.

As illustrate in FIG. 10, the spacing means in the present exemplary embodiment are formed of a plurality of cylinder like projections 213 disposed orderly on the surface of a small thickness area 180 of a side wall 18.

The thickness of the projections 213 is made larger than that of large thickness sections 30 of the side wall 18. Therefore, the tips of the projections 213 are sticking out of the outer surface level of the large thickness sections 30.

Accordingly, then a plurality of unit battery cells B are put together to build a multi-tier battery, the spacing means in the present exemplary embodiment make it possible to provide spacious heat dissipation channels that are formed between the side walls 18 of two neighboring unit battery cells B, thus allowing air to circulate smoothly and resulting in excellent heat dissipation performance.

Sixth Exemplary Embodiment

Next, a sixth exemplary embodiment of the present invention is explained with reference to FIG. 11.

The fundamental structure of unit battery cells B in the present exemplary embodiment is the same as in the first and second exemplary embodiments and what is different from the exemplary embodiments so far explained with the present exemplary embodiment is in the structure of spacing means as experienced before.

Figure 11:
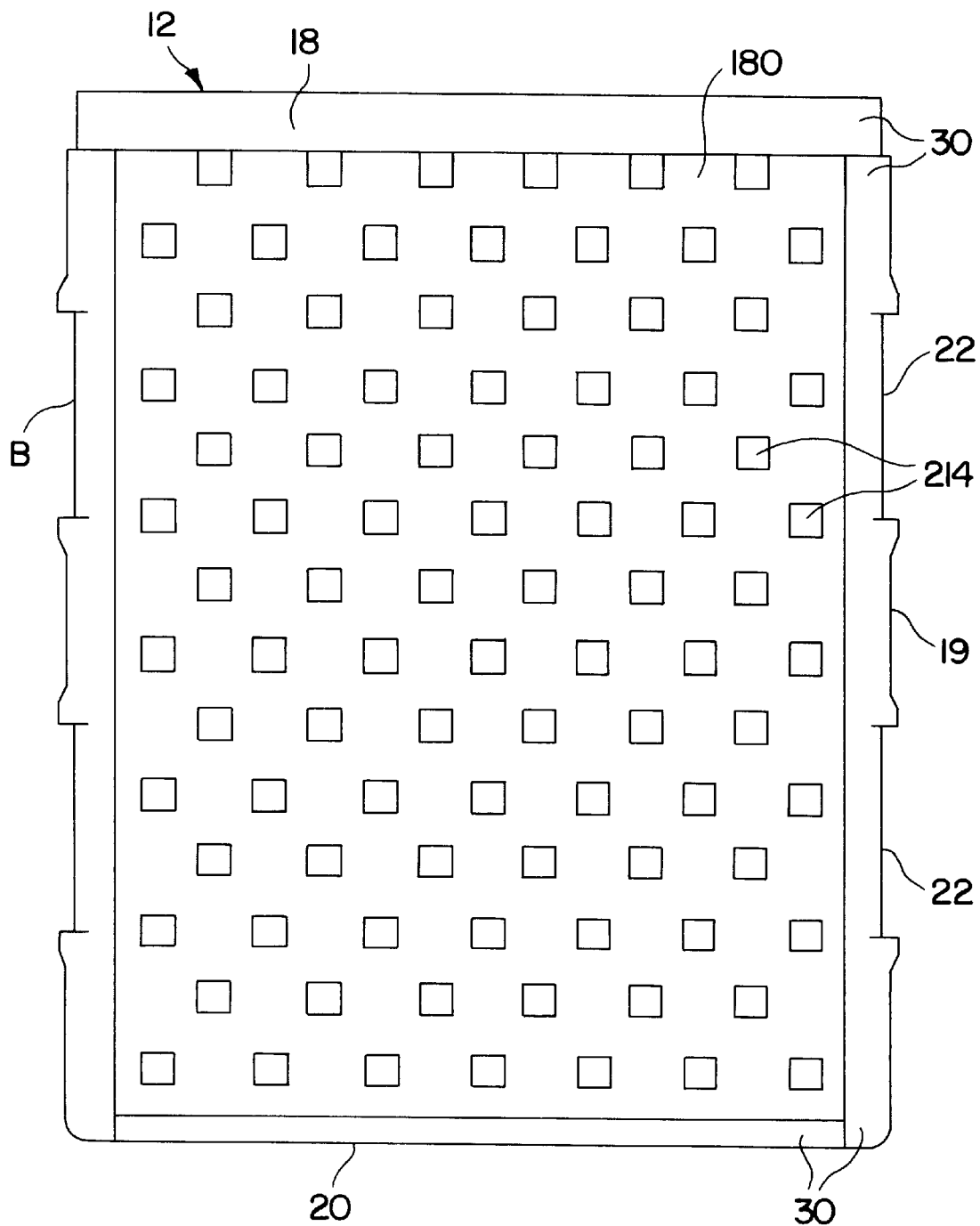
FIG. 11 is a partial front view of a side wall of a multi-tier battery container in a sixth exemplary embodiment of the present invention.

As illustrated in FIG. 11, the spacing means in the present exemplary embodiment are formed of a plurality of square pillar like projections 214 disposed orderly in a staggered arrangement on the surface of a small thickness area 180 of a side wall 18.

The thickness of the projections 214 is made larger than that of large thickness sections 30 of the side wall 18. Therefore, the tips of the projections 214 are sticking out of the outer surface level of the large thickness sections 30.

Accordingly, when a plurality of unit battery cells B are put together to build a multi-tier battery in the same way as in the foregoing fifth exemplary embodiment, the spacing means in the present exemplary embodiment make it possible to provide spacious heat dissipation channels that are formed between the side walls 18 of two neighboring unit battery cells B, thus allowing air to circulate smoothly and resulting in excellent heat dissipation performance.

Seventh Exemplary Embodiment

Figure 12:
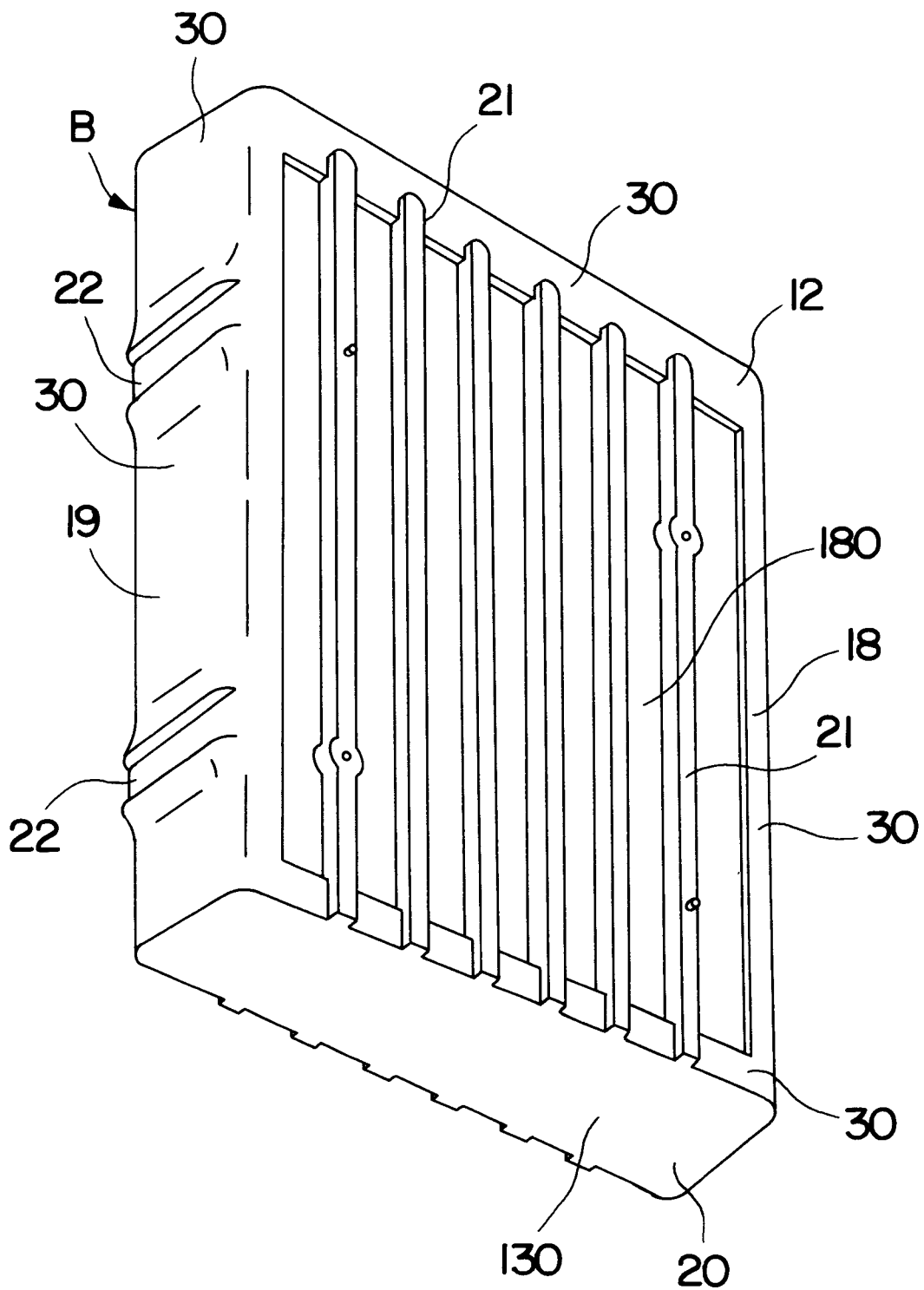
FIG. 12 is a perspective view of a multi-tier battery container in a seventh exemplary embodiment of the present invention.

Next, a seventh exemplary embodiment of the present invention is explained with reference to FIG. 12.

The fundamental structure of unit battery cells B in the present exemplary embodiment is the same as in the first and second exemplary embodiments and what is different from the exemplary embodiments so far explained in the present exemplary embodiment is in the structure of spacing means and in having no inclined surfaces 181 that have been provided in the first exemplary embodiment to the sixth exemplary embodiment.

The spacing means formed of straight-line ribs 21 is disposed over the outer surface of a small thickness area 180 of a side wall 18 with each respective end thereof overlapping on an upper large thickness section 30 and a lower large thickness section 30.

In addition, both ends of each respective straight-line rib 21 that overlap on the large thickness sections 30 are sticking out from the outer surface of the large thickness sections 30.

Therefore, when a plurality of unit battery cells B are put together to build a multi-tier battery, the ends of straight-line ribs 21 of one unit battery cell B hit the ends of another neighboring unit battery cell B contacting with one another, thereby forming spacious heat dissipation channels H between two neighboring unit battery cells B.

Furthermore, since each respective spacing means formed of the straight-line ribs 21 is extending on the large thickness sections 30 of the side wall 18, the force imposed on the small thickness area 180 can be suppressed even when a pressing force is exerted on each respective unit battery cell B in the longitudinal direction of the multi-tier battery.

Eighth Exemplary Embodiment

Figure 13:
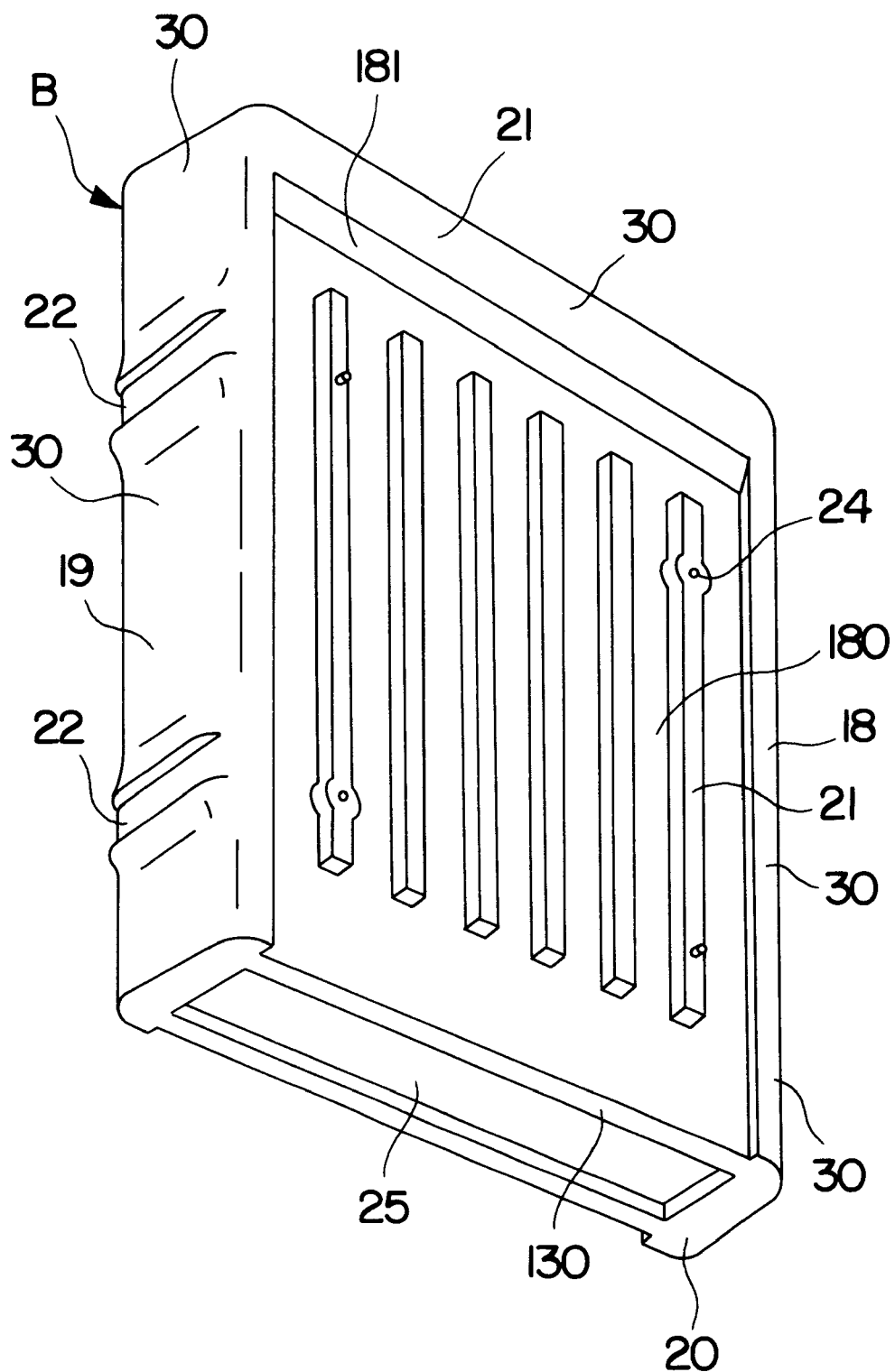
FIG. 13 is a perspective view of a multi-tier battery container in an eighth exemplary embodiment of the present invention.

Next, an eighth exemplary embodiment of the present invention is explained with reference to FIG. 13.

The fundamental structure of unit battery cells B in the present exemplary embodiment is the same as in the first and second exemplary embodiments and what is different from the exemplary embodiments so far explained in the present exemplary embodiment is that the large thickness sections 30, which have been disposed on the rims at four sides of each respective side wall 18 in the first to seventh exemplary embodiments, are disposed only on three sides of the side wall 18, i.e. right, left and upper sides in the present exemplary embodiment, missing from the side of bottom of the side wall 18.

Thus, the container 10 for a unit battery cell B in the present exemplary embodiment has large thickness sections 30 formed on the rims of three sides excluding the side of bottom of each respective side wall 18, thereby the bottom section of the side wall 18 having the same thickness as the small thickness area 180.

Since a small thickness area 130 of the bottom 20 of the container 10 also has the same thickness as the bottom section of the side wall 18, when the unit battery cells B are put together to build a multi-tier battery the bottom sections of the side walls 18 of neighboring unit battery cells B provide an open space as a whole realizing extremely spacious heat dissipation channels, whereby air flow is made smooth, resulting in excellent heat dissipation.

Explanations have been made in the above on battery envelopes and batteries of the present invention in various exemplary embodiments, and in addition some other exemplary embodiments are possible as in the following:

(a) Although small thickness areas have been formed only on the side walls that are situated opposite to each other in the foregoing various exemplary embodiments, small thickness areas can be formed on any walls of the container 10 that are selected in an arbitrary manner.

For example, the small thickness areas can be provided on all of the side walls 18, side walls 19 and bottoms 20, or on the side walls 19 only, or on the bottoms 20 only, or on lids 13 only.

(b) The large thickness sections 30 that are disposed in parallel with ribs 21 are made equal to the ribs 21 in height or made higher than the ribs 21 and then unit battery cells B having the foregoing large thickness sections 30 are put together to build a multi-tier battery.

In this case, even when groups of electrode 11 may bulge due to a repetition of charging and discharging, the foregoing structural arrangement is effective in preventing an excessive pressure from being imposed on the ribs 21.

It is also possible to improve air flow by having two pairs of large thickness sections running in parallel with one another made different in thickness.

(c) In the foregoing exemplary embodiments, the straight-line ribs 10 are disposed along the vertical direction of the container 10, but it is also possible to have the straight-line ribs 10 disposed along the horizontal direction of the container 10.

Particularly, when air is forced to flow by the use of a fan for heat dissipation, shapes of spacing means and structures of heat dissipation channels H are preferred to be changed as needed for a better flow of cooling air.

(d) In the exemplary embodiments as shown in FIG. 1 to FIG. 6, the straight-line ribs 21 on any two neighboring unit battery cells B are directly hitting one another at each respective end thereof, but it is also possible to have the positions of straight-line ribs 21 shifted so that the straight-line ribs 21 of one unit battery cell 13 hit on the outer surface of the large thickness sections 30 of the other unit battery cell B.

The material and structure for the battery container of the present invention can employ the same as used in ordinary battery containers.

The material for the battery container is preferred to have mechanical characteristics to withstand external force and internal pressure that are applied to the material when in use and chemical characteristics to withstand electrolyte and the like that are contained in the container made of the material.

Candidates for the material as described in the above are synthetic resins like polymer alloy resins and the like including polypropylene resin, polyphenylene ether resin and polystyrene resin, for example.

The structure of the container comprises a housing provided with a compartment, wherein such battery elements as ordinary electrolyte, electrodes and the like are contained, and a lid to cover an opening formed on one of the surfaces of the housing, and the whole container is usually shaped like a rectangular prism.

According to the present invention, however, a cube of other configurations can be employed as the shape of the container. When a battery is formed of a plurality of unit battery cells by putting them together in a multi-tier structure, the container, of each respective unit battery cell is preferred to be like a thin and tall rectangular prism appearing like a book.

Also, a small thickness area Provided on a side wall can be configured by having a recess formed on the outer or inner surface or both surfaces of the side wall.

The bottom pane of each respective small thickness area is allowed to be making a flat surface, a curved surface or a surface having projections and depressions.

Further, a small thickness area can be configured so as to reduce gradually the thickness thereof from that of the large thickness section situated next thereto as the distance thereof from the large thickness section increases. Also, a small thickness area can be formed by abruptly dropping from the outer surface of the large thickness section.

In addition to the dimensions as indicated in the exemplary embodiments as described in the above, the thickness of large thickness sections of a side wall can be made 1 to 4 mm or 2 to 8 mm, for example, and the width thereof can be made equal to the thickness thereof or larger than that.

Further, spacing means can be made conical, pyramid-like, hemispheric or the like in shape in addition to the configurations as described in the above, and one spacing means or a plurality if spacing means can be employed.

A plurality if the projections that are formed on walls of a battery container can also be disposed on the outer surfaces of the container in an orderly manner or randomly. These projections can be arranged vertically, diagonally or horizontally in one row or in a plurality of rows depending on battery's use conditions, but a vertical arrangement of the projections allows coolants and heat to flow efficiently.

When a coolant is forced to flow in a battery, a plurality of projections can be arranged along the direction of flow of the coolant.

When projections are cylindrical in shape, projections having, for example, a diameter of 1.6 to 10 mm, a distance between the end of projection and the outer surface of a large thickness section ranging from 0.5 to 2 mm and a spacing between the centers of projections ranging from 3 to 14 mm can be used.

When straight-line ribs or latticed ribs serving as spacing means are disposed so as to extend from one large thickness section to the opposing large thickness section as explained in the seventh exemplary embodiment, it is preferred that the distance between the upper end of the ribs and the outer surface of the large thickness section ranges from 0.5 to 2 mm, the spacing between ribs ranges from 3 to 15 mm and the width of each respective rib ranges from 1 to 10 mm. The cross-sectional profile of these ribs can be made square, rectangular, trapezoidal, half-round, triangular or the like.

Also, when straight-line ribs serving as spacing means are not disposed continuously along the direction of the length thereof, a coolant can flow not only in the direction along the straight-line ribs but also can traverse the lines of the ribs crossing the areas where the ribs are missing.

The small thickness areas and spacing means as described in the above can be formed as projections and recesses on the surfaces of a battery container during the process of molding.

Alternatively, the battery container and the elements of spacing means are fabricated separately and then these can be put together by means of adhesion, welding and the like.

Spacing means can be provided with other projections and recesses of various shapes than ribs for increasing heat dissipation.

In a multi-tier battery of the present invention, a plurality of unit battery cells can be put together with only one unit battery cell of two neighboring unit battery cells provided with a spacing means and the other unit battery cell provided with no spacing means, and it is still possible for the multi-tier battery to maintain the heat dissipation at adequate levels since heat dissipation channels for coolants are provided by the existence of at least one spacing means between two neighboring unit battery cells.

Possible Contributions to the Industry

As described in the foregoing, since the battery container and battery of the present invention have walls, on the outer rims of which relatively thick large thickness sections are formed, and a small thickness area is formed on each respective area surrounded by the large thickness sections and further a spacing means formed of straight-line ribs and the like is provided on the small thickness area, the transfer path for the heat produced within the battery can be made short due to the existence of the small thickness areas formed on the walls of the container even in the case of a unit battery cell and further heat dissipation areas can be made large, thereby improving a heat dissipation ability remarkably when compared with prior art batteries, and when the foregoing unit battery cells are put together to build a multi-tier battery, extremely efficient heat dissipation channels can be formed, thus enabling to contribute greatly to enhancement of performance and an extention of life of batteries while maintaining excellent mechanical strength when compared with prior art batteries.

What is claimed is:

1. A battery container for containing battery elements comprising:
   first and second side walls, each of which has:
      (a) large thickness sections extending along the peripheries thereof,
      (b) a small thickness area within said large thickness sections with the thickness of said small thickness area less than the thickness of said large thickness sections, and
      (c) a plurality of spacers protruding from said small thickness area to beyond said large thickness sections;
   first and second end walls extending between said first and said second side walls;
   a bottom wall extending:
      (a) transverse to said first and said second side walls and said first and said second end walls, and
      (b) between said first and said second side walls and said first and said second end walls.

2. A battery container for containing battery elements according to claim 1 wherein said spacers are ribs which extend vertically.

3. The battery container according to claim 1, wherein the area occupied by said small thickness area accounts for 40 to 80% of the wall's area of the wall that has a larger area.

4. The battery container according to claim 1, wherein the thickness of said small thickness area is 20 to 70% of that of said large thickness sections.

5. The battery container according to claim 1, wherein at least one pair of side walls are provided with said small thickness areas.

6. The battery container according to claim 1, wherein said spacing means is formed of straight-line ribs.

7. The battery container according to claim 1, wherein said spacing means is formed of a combination of latticed ribs and projections.

8. The battery container according to claim 1, wherein said spacing means is formed so as to extend to said large thickness sections on the side walls.

9. The battery container according to claim 1, wherein said spacing means is formed of cylindrical projections.

10. The battery container according to claim 1, wherein said spacing means is formed of square pillar like projections that are disposed on said small thickness area in a staggered arrangement.

11. A battery comprising the battery container as cited in claim 6 and battery elements.

12. A battery comprising the battery container as cited in claim 7 and battery elements.

13. A battery comprising the battery container as cited in claim 8 and battery elements.

14. A battery comprising the battery container as cited in claim 9 and battery elements.

15. A battery comprising the battery container as cited in claim 10 and battery elements.

16. A battery comprising:
   a battery container having:
      (a) first and second side walls each of which has:
         (1) large thickness sections extending along the peripheries thereof,
         (2) a small thickness area within said large thickness sections with the thickness of said small thickness area less than the thickness of said large thickness sections, and
         (3) a plurality of spacers protruding from said small thickness area to beyond said large thickness sections;
      (b) first and second end walls extending between said first and said second side walls; and
      (c) a bottom wall extending:
         (1) transverse to said first and said second side walls and said first and said second end walls, and
         (2) between said first and said second side walls and said first and said second end walls; and
   battery elements within said container.

17. A battery according to claim 16 wherein said spacers are ribs which extend vertically.

18. A multi-tier battery comprising a plurality of the batteries according to claim 16 assembled together.

19. A battery container for containing battery elements comprising:
   first and second side walls, each of which has:
      (a) large thickness sections extending along the peripheries thereof, comprising two pairs of sections, each pair parallel to one another and each pair differing in thickness from the other,
      (b) a small thickness area surrounded by said large thickness sections with the thickness of said small thickness area being less than the thickness of said large thickness sections, and
      (c) a plurality of spacers protruding from said small thickness area to beyond said large thickness sections;
   first and second end walls extending between said first and second side walls; and
   a bottom will extending:
      (a) transverse to said first and second side walls and said first and second end walls,
      (b) between said first and second side walls and said first and second end walls.

20. A battery comprising the battery container as cited in claim 19 and battery elements.

* * * * *

UNITED STATES PATENT AND TRADE MARK OFFICE
CERTIFICATE OF CORRECTION

PATENT NO. : 6,033,800
DATED : March 7, 2000
INVENTOR(S) : Ichiyanagi et al.

It is certified that error appears in the above-identified patent and that said Letters Patent is hereby corrected as shown below:

Cover page, item [56] References Cited, insert :

--OTHER PUBLICATIONS

Japanese Search Report dated April 22, 1997 for Int'l Appln. No. PCT/JP97/00085.--

Signed and Sealed this

Tenth Day of April, 2001

*Attest:*

NICHOLAS P. GODICI

*Attesting Officer*        *Acting Director of the United States Patent and Trademark Office*